United States Patent
Adams et al.

[19]

[11] Patent Number: 5,769,027
[45] Date of Patent: Jun. 23, 1998

[54] AQUACULTURE CONTAINER AND CONSTRUCTION

[76] Inventors: Anjanette M. Adams; Anthony L. Mertz, both of 1745 Vine St., McKinleyville, Calif. 95519

[21] Appl. No.: 806,688

[22] Filed: Feb. 26, 1997

[51] Int. Cl.$^6$ .................................................. A01K 61/00
[52] U.S. Cl. ............................ 119/238; 119/223; 119/239
[58] Field of Search .................................... 119/223, 238, 119/239, 241

[56] References Cited

U.S. PATENT DOCUMENTS

| | | |
|---|---|---|
| 2,620,588 | 12/1952 | Critser . |
| 3,717,124 | 2/1973 | Jacobs . |
| 3,741,159 | 6/1973 | Halaunbrenner . |
| 3,870,019 | 3/1975 | McNicol . |
| 3,906,655 | 9/1975 | Lowenthal, Jr. . |
| 4,003,338 | 1/1977 | Neff et al. . |
| 4,079,698 | 3/1978 | Neff et al. . |
| 4,377,987 | 3/1983 | Satre . |
| 5,009,189 | 4/1991 | Neff . |
| 5,251,571 | 10/1993 | Willinsky et al. ....................... 119/215 |
| 5,429,074 | 7/1995 | Nelson et al. ........................... 119/239 |

FOREIGN PATENT DOCUMENTS

| | | | |
|---|---|---|---|
| 6237666 | 8/1994 | Japan ..................................... | 119/223 |
| 1026734 | 7/1983 | U.S.S.R. ................................. | 119/239 |
| 1316612 | 6/1987 | U.S.S.R. . | |
| 1515253 | 6/1978 | United Kingdom . | |
| 1516483 | 7/1978 | United Kingdom . | |
| 2044591 | 10/1980 | United Kingdom . | |
| 2078473 | 1/1982 | United Kingdom . | |

*Primary Examiner*—Robert P. Swiatek
*Attorney, Agent, or Firm*—Richard C. Litman

[57] ABSTRACT

An aquaculture container for raising shellfish is formed of a homogeneous, monolithic monocoque shell by forming one or more openings therein and installing screen, net, or mesh over the opening(s). The container may be formed of a plastic 55 gallon barrel or drum, or other shapes, sizes, and configurations of containers may be used alternatively. The container has at least one panel or end which is removably secured thereto, for access to the interior thereof. An insert may be removably installed within the container to provide additional internal surface area for shellfish, as well as support for nutrients added to the container. The internal surfaces of the container shell and insert preferably roughened in order to provide a better grip for the attachment of shellfish thereto, particularly for shellfish such as abalone which remain mobile throughout their lives. Preferably, all of the components of the container are formed of plastic or at least a non-corrosive material, to preclude corrosion or deterioration in a salt water environment. The plastic material allows the container to be constructed using a plastic welding method. The present container with its roughened interior and additional surface area provided by an insert therein, is particularly well suited for growing abalone which remain mobile throughout their lifespans, but may be used for growing other shellfish which essentially immovably affix themselves to a surface during at least the adult portions of their lifespans.

15 Claims, 3 Drawing Sheets

AQUACULTURE CONTAINER AND CONSTRUCTION

BACKGROUND OF THE INVENTION

1. FIELD OF THE INVENTION

The present invention relates generally to equipment used in the raising of aquatic and maritime animals, and more specifically to an aquaculture container or habitat for the growing of shellfish such as abalone and the like. The present habitat is a portable structure which is placed in a suitable aquatic environment and initially stocked with juvenile animals which grow to marketable size therein. The habitat is then removed from the water and the animals harvested for marketing, with the habitat being restocked for further use.

2. DESCRIPTION OF THE PRIOR ART

In times past, the harvesting or collection of many marine or aquatic animals, particularly shellfish, was merely a matter of picking them up (or prying them from the rocky tide pool areas of their environment, in the case of shellfish such as abalone) and taking the collected shellfish to market. However, as various forms of shellfish have become more popular as a food, it has become increasingly difficult to collect such animals in their natural habitats. This is all the more true in view of the competition for such animals by other animals, the statutory limitations placed upon their collection, pollution, and other factors.

Accordingly, various marine and aquatic animals are increasingly being raised in artificial environments of various sorts (e. g., fish farms). Most such devices developed heretofore are relatively labor intensive to construct and/or to use, not suited for use with shellfish such as abalone, constructed materials which may deteriorate when exposed to the elements over a period of time, or have some other deficiency. A discussion of the prior art of which applicants are aware, and its differences and distinctions from the present invention, is provided below.

U.S. Pat. No. 2,620,588 issued on Dec. 9, 1952 to Kenneth M. Critser describes a Bait Receptacle comprising a generally cylindrical container having a screened outer cylindrical wall with a divider installed diametrically and centrally therein. As the device is intended for only short time containment of bait fish, little or no provision is made for attachment surfaces to which shellfish may adhere to grow and develop. The completely screened cylindrical exterior is also not universally desirable for a shellfish growing habitat, nor is the separation of the two halves of the container. The present invention is better adapted for use as a shellfish (particularly abalone) growing habitat, with its large interior surface area providing for the attachment of numerous shellfish thereto, and selectively screened portions of the outer wall providing water circulation through the container as desired, depending upon the water flow in the area of use.

U.S. Pat. No. 3,717,124 issued on Feb. 20, 1973, to Karl F. Jacobs describes a Fish Culture Cage Assembly comprising a screened cylindrical container including a float surrounding the upper edge thereof. The general configuration is similar to that of the Critser bait container discussed immediately above, with most of the distinctions of the Critser device also applying here. No internal structure is disclosed for the attachment of shellfish thereto, as provided by the present invention.

U. S. Pat. No. 3,741,159 issued on Jun. 26, 1973 to Lazare N. Halaunbrenner describes a Cage For Breeding Shellfish comprising a plurality of concentric cylindrical screened containers assembled on a central shaft. Float means are provided to allow the device to be anchored and suspended at some predetermined depth, as desired. The plural concentric containers preclude the insertion or removal of a single concentric habitat shelf or insert into or from the cage, as is provided by the present invention.

U.S. Pat. No. 3,870,019 issued on Mar. 11, 1975 to Douglas McNicol describes an Oyster Culture Basket comprising a plurality of radially divided baskets having an open central core. The baskets may be stacked concentrically upon one another to form a plurality of individual compartments. The present container has a completely open interior volume to allow the removable insertion of a single structure therein as desired, for the support of additional shellfish and/or nutrients for such shellfish. The interior of the present container is easily accessible by removing a single lid or panel, unlike the McNicol device.

U.S. Pat. No. 3,906,655 issued on Sep. 23, 1975 Walter S. Lowenthal, Jr. describes a Trap And Cage For Aquatic Animals comprising a generally cubical screened structure having a plurality of baffles therein. The structure may be disassembled into a plurality of flat sheets for storage. The interior is broken up into a plurality of separate areas, as is typical for a crab trap, and no means is provided for the removable insertion of a concentric shelf or insert structure therein, as provided by the present container.

U.S. Pat. No. 4,003,338 issued on Jan. 18, 1977 to Gregor N. Neff et al. describes an Aquatic Animal Cage And Fabrication Method comprising a flexible fabric screen which is secured to an upper peripheral pipe. The screen depends from the pipe, which is supported by float means. The flexible screen walls of the device are unsuited for use as a shellfish raising container, and do not provide the required strength and rigidity for the attachment of internal structure thereto, as provided by the present container.

U.S. Pat. No. 4,079,698 issued on Mar. 21, 1978 to Gregor N. Neff et al. describes an Aquatic Animal Cage formed similarly to the cage described immediately above to the same inventors. The limitations of the use of flexible net material for the side walls also applies here.

U.S. Pat. No. 4,377,987 issued on Mar. 29, 1983 to Alf R. Satre describes a System For Growing Oysters comprising a plurality of relatively thin trays concentrically stackable with one another. A series of notches are formed in the sides of the trays to engage ropes which are used to support the trays. A net cover or lid is installed over the trays. The device does not have a continuous interior volume with a removably installable concentric insert, as provided by the present container.

U.S. Pat. No. 5,009,189 issued on Apr. 23, 1991 to Gregor N. Neff describes an Aquatic Cage And Method comprising a flexible net material and steel reinforcement bar periphery. The present container is of homogeneous construction throughout the solid portions of the external shell, with the shell of the device also forming the structural frame, unlike the Neff container.

U.S. Pat. No. 5,251,571 issued on Oct. 12, 1993 to Michael D. Willinsky et al. describes a Submersible Cage System For Culturing Aquatic Animals, comprising a geodesic structure having a three dimensional polyhedral frame covered with a flexible fabric net material. No solid panels are provided for the attachment of shellfish thereto, as provided by the present container.

U.S. Pat. No. 5,429,074 issued on Jul. 4, 1995 to Eddie Nelson et al. describes a Storage Apparatus For Cultivating Oysters, comprising two concentric cylindrical screened containers. The containers may be rotated with respect to one another, effectively altering the gauge or mesh of the screen. A float is included in the interior of the container, unlike the present device.

British Patent Publication No. 1,515,253 published on Jun. 21 1978 to Yoshida Kogyo K. K. describes a Fish Rearing Enclosure With A Readily Closeable Mouth, comprising a rigid frame covered by a flexible fabric net material. The upper end of the device is selectively openable and closeable by slide fastener (zipper) means or the like. A flexible material is required due to the zipper closure, whereas the present container provides solid walls and a solid insert for better adhesion of shellfish thereto, unlike the Yoshida Kogyo device.

British Patent Publication No. 1,516,483 published on Jul. 5, 1978 to Yoshida Kogyo K. K. describes a Device For Culturing Shellfish comprising a rigid frame structure covered with flexible net material and having zipper closure means, as in the British '253 patent publication to the same inventors discussed immediately above. No rigid sheet surfaces are provided for the attachment of shellfish thereto, as provided by the present invention.

British Patent Publication No. 2,044,591 published on Oct. 22, 1980 to Albert Blair describes a Rotatable Fish Cage comprising an enclosure with selectively inflatable floats at various points therein. The cage may be rotated to expose and kill marine growth thereon, by selectively inflating lower floats and filling higher floats with water. The process is suitable for use with marine animals capable of moving readily, but is unsuitable for use with marine animals which live out their lives in a fixed position, as the periodic rotation of the cage would destroy those animals when they are subject to prolonged exposure out of the water.

British Patent Publication No. 2,078,473 published on Jan. 13, 1982 to Camille Lemarchand describes Aquiculture comprising a plurality of flexible net enclosures placed upon the bottom of the body of water and held in shape by selective placement of weights and floats. The flexible nature of the enclosures precludes any solid attachment for shellfish which require a fixed and rigid attachment point. Moreover, no means is provided to raise the enclosures to the surface for harvesting the animals therein. Rather, a separate container is lowered to the enclosures and the animals are transferred from the enclosures to the separate transport container, unlike the present invention which is lifted from the bottom for culling and harvesting of the shellfish therein.

Finally, Soviet Patent Publication No. 1,316,612 published Jun. 15, 1987 illustrates fish farming equipment featuring a caisson chamber with connecting pipe and with air releasing apertures. The need for a caisson chamber with a fish enclosure is not understood, as the term "caisson" in the maritime environment refers to a watertight enclosure enabling workers therein to perform work below the surface of the water. In any event, no disclosure is apparent of any homogeneous, monolithic shell being used for the container, nor of any openable end providing for the installation and removal of an insert into the chamber, as provided by the present invention.

None of the above inventions and patents, either singly or in combination, is seen to describe the instant invention as claimed.

SUMMARY OF THE INVENTION

The present invention comprises an aquaculture container for the raising of shellfish, particularly abalone, although the container may be used for other species of aquatic animals as well. The container is formed of a homogeneous and monolithic monocoque shell, with one or more openings being formed therein in a predetermined pattern. The openings are covered with a screen, net, or mesh material. One end of the container is openable or removable to provide access to the interior for installation and/or removal of an insert to provide additional surface area for the shellfish being raised therein, and for the placement of nutrients thereon within the container. The components used in the construction of the present container are preferably plastic, to preclude corrosion and/or deterioration due to exposure to salt water and the elements. A method of construction including plastic welding of the components is also disclosed. The container shell may comprise a modified 55 gallon plastic drum or barrel, but other shapes, sizes, and configurations may be used also.

Accordingly, it is a principal object of the invention to provide an improved aquaculture container providing for the raising of shellfish therein.

It is another object of the invention to provide an improved aquaculture container having an exterior shell formed as a single, integral and monolithic monocoque structure in the form of a cylindrical barrel or drum or other suitable shape and configuration.

It is a further object of the invention to provide an improved aquaculture container including at least one permanently screened opening therein, with the container having at least one removable panel or end providing access to the interior of the container.

An additional object of the invention is to provide an improved aquaculture container including a removably installable insert providing additional internal surface area within the container shell.

Still another object of the invention is to provide an improved aquaculture container which components are formed of plastic to provide resistance to corrosion and deterioration.

Yet another object of the invention is to provide an improved method of construction for an aquaculture container, comprising plastic welding of the components thereof.

It is an object of the invention to provide improved elements and arrangements thereof in an apparatus for the purposes described which is inexpensive, dependable and fully effective in accomplishing its intended purposes.

These and other objects of the present invention will become readily apparent upon further review of the following specification and drawings.

BRIEF DESCRIPTION OF THE DRAWINGS

Similar reference characters denote corresponding features consistently throughout the attached drawings.

DETAILED DESCRIPTION OF THE PREFERRED EMBODIMENTS

Figure 1:
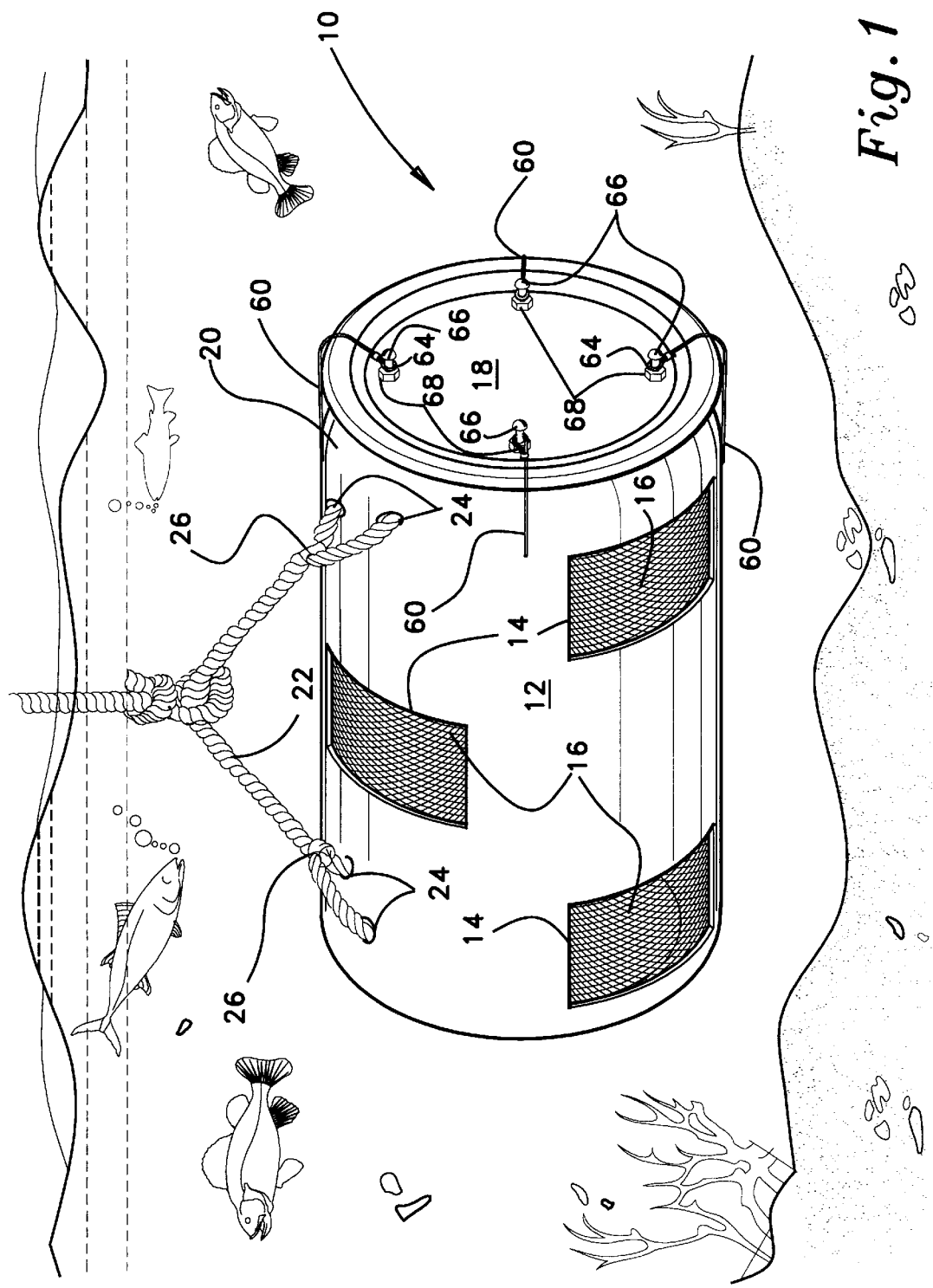
FIG. 1 is an environmental perspective view of an embodiment of the present aquaculture container in use, showing its various features.

The present invention comprises an aquaculture container for the raising of various forms of marine or aquatic life for commercial purposes, particularly shellfish, and more particularly abalone, although the present container is adaptable to use in the raising of other aquatic and marine animals as well. FIG. 1 shows a perspective view of one embodiment of the present aquaculture container in use, with the container of FIG. 1 being generally designated by the numeral 10.

The container 10 is formed of a solid, homogeneous, monolithic, and rigid monocoque shell 12, preferably of plastic, although other materials may be used. The container shell 12 may be in the form of a generally cylindrical barrel or drum, as shown in the various drawing figures, or may have some other geometric form, such as a cube or other box-like structure, etc., as desired.

The container 10 includes at least one opening 14, and preferably several such openings, formed therethrough. Each opening 14 is covered by screen means 16 (screen, net, mesh, foraminous sheet material, etc.) to allow the passage and circulation of water through the container 10. A removably installed panel 18 is also provided for access to the internal volume of the container 10. In the cylindrical barrel embodiment of the present invention, the panel 18 comprises the lid of the barrel or drum from which the present container 10 is formed, with the lid 18 being removably secured to an access end 20 of the drum.

Normally, the present container 10 is suspended above the bottom of a relatively shallow body of water, as shown in FIG. 1. Accordingly, some form of suspension means is required, such as the flexible rope support 22 extending from the shell 12 shown in FIG. 1. The rope is preferably a synthetic plastic material (Nylon, tm; Dacron, tm; etc.) to preclude deterioration in the environment of intended use, where the container 10 will be exposed to salt water, ultraviolet from sunlight, etc. A pair of support attachment holes 24 are formed near each end of the container shell 12, and each free end of the rope 22 is looped through one of the pairs of holes 24. The free ends are then spliced into the standing portion of the rope 22 to the outside of the container shell 12, to form an eye splice 26 around the material between each of the holes 24 comprising each pair. The rope support 22 provides for the attachment of further devices (marker buoys, lifting lines, etc.), which are conventional and not shown in the drawings.

Figure 2:
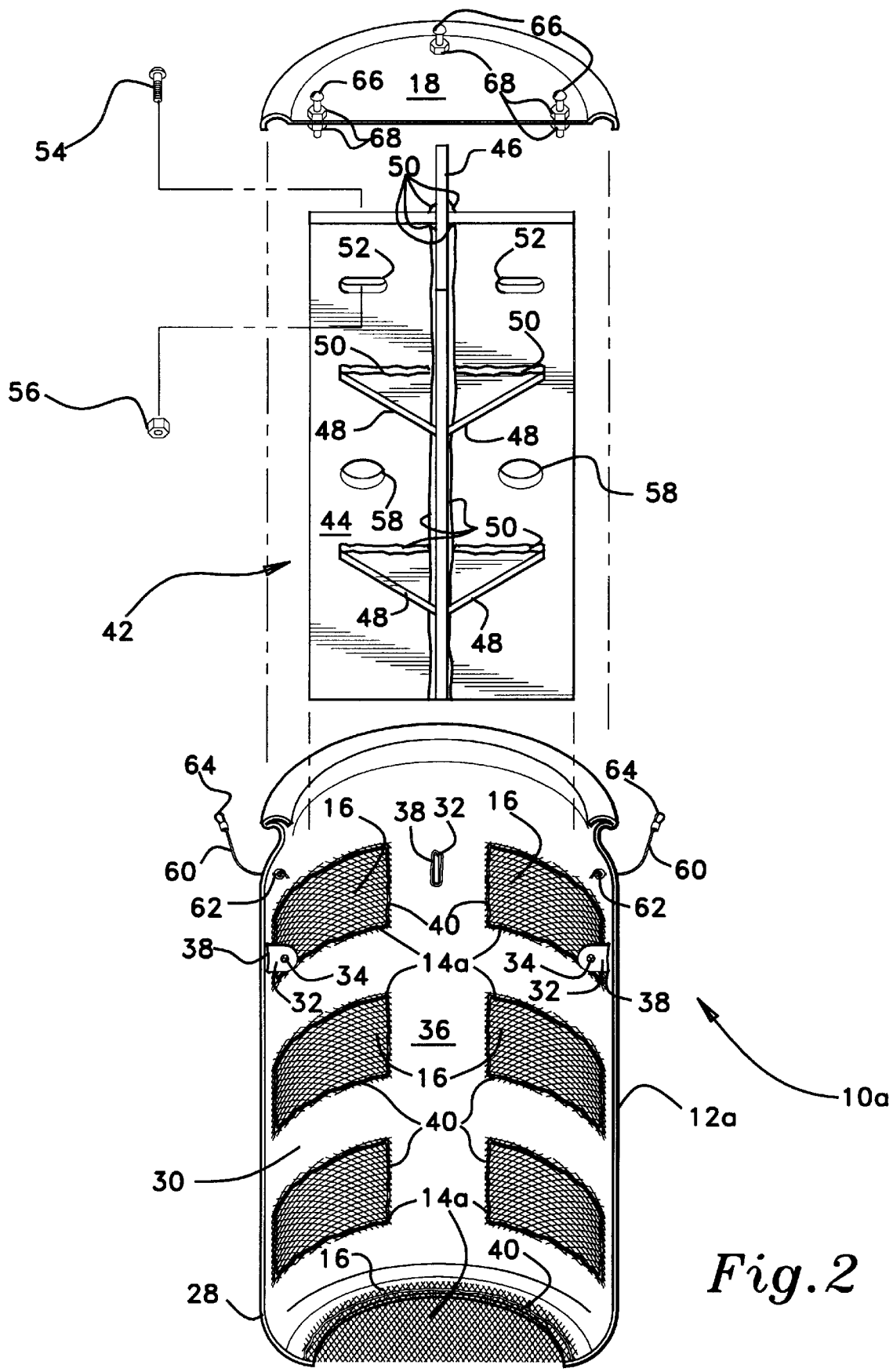
FIG. 2 is an exploded perspective view in section of the internal components and construction of the present container.

FIG. 2 discloses a perspective view in section of a second embodiment of the present aquaculture container, designated as container 10a. It will be seen that the containers 10 and 10a are essentially identical, with the exception of the position and number of screened openings 14a installed therein. These openings 14 or 14a may be formed as required, depending upon the intend environment of use of the present container. For example, the container 10a of FIG. 2 is better suited for use in relatively slow moving water, with the additional screened openings 14a formed therein providing for additional water flow through the container 10a. It should also be noted that the openings 14 and/or 14a, while being shown as rectangular, may be formed in any suitable shape or configuration as desired, and/or formed in other areas of the container than the side, such as the fixed end 28. The opposite removable end 18 may also include a screened opening therein if desired, in the manner of the fixed end 28 of FIG. 2. Otherwise, the structure of the container 10a of FIG. 2 is interchangeable with that of the container 10 of FIG. 1.

The aquaculture container 10a will be seen to have a single unbroken internal volume 30 extending continuously therethrough, devoid of internal partitions and the like which would impede water flow therethrough. This allows a person to access the entire internal volume 30 of the container 10/10a by means of a single removable panel or lid 18, rather than being required to perform multiple disassembly tasks in order to gain access to the entire volume of the container, as is required with some other devices.

Although not required of the present aquaculture container invention, preferably some internal structure is included to provide additional internal surface area to which additional shellfish may attach themselves and for the placement of nutrients within the container. The container 10a of FIG. 2 shows such internal structure attachment means, comprising a plurality of tabs 32 each having a fastener hole 34 therethrough. The tabs 32 are secured to the internal surface area 36 of the container 10a by means of plastic welding, as indicated by the plastic welding bead 38 formed around the base of each of the tabs 32. The screens 16 are secured to the internal surface 36 of the container 10a in a like manner, with the plastic welding bead 40 shown overlapping the screens 16 inside the container 10a.

The removable internal structure provided for the present containers 10 and 10a comprises a shellfish support insert 42, which may be removably installed within the container to increase the internal surface area within the container shell. The insert 42 is formed of a first sheet 44 and a second sheet 46 of materials joined orthogonally together to provide a cruciform cross section, with one or more gussets 48 installed between the first and second sheets 44 and 46 to provide additional crawl surface for abalone (or other mobile animals) to conceal themselves and to provide a more realistic environment for such animals. The gussets 48 also serve to help stiffen the insert 42. The insert 42 is preferably assembled in the same manner as that used to secure the insert attachment tabs 32 and screens 16 to the inner surface 36 of the containers 10 and 10a, i. e., by plastic welding, as indicated by the plastic welding beads 50 at the junctures of the first and second sheets 44 and 46 and gussets 48.

The insert 42 is removably secured within the container 10 or 10a by means of a plurality of insert attachment passages 52, corresponding to the insert mounting holes 34 formed in each of the internal structure attachment tabs 32. Threaded fasteners, such as the bolt 54 and nut 56 of FIG. 2, may be used to secure the insert 42 to the tabs 32 within the interior 30 of the aquaculture container 10 or 10a. (Additional components, such as washers, locking means, etc., may be used as desired, but are not shown in order to provide greater clarity in the drawing figure.) Preferably, the fasteners 54 and 56 are also plastic, in order to preclude corrosion or deterioration in the harsh environment of intended use of the present containers. Additional flow passages 58 may be provided through the two sheets 44 and 46 of the insert 42 as desired, to allow abalone or other mobile marine animals to move between different quadrants of the container, as defined by the cruciform insert 42, and to provide additional water flow therethrough.

FIG. 2 also provides a more detailed view of the removable attachment means for securing the lid or access panel 18 to the container shell 12a (or shell 12 of FIG. 1). A plurality of panel attachment lines 60 are secured to the container shell 12 or 12a near the panel 18, for attaching the panel 18 to the container shell 12 or 12a. These lines 60 are preferably an elastomer (e.g., "shock cord"), with a container attachment end 62 passing through a hole in the side of the container 12 or 12a and doubled over to preclude its pulling through the hole. The doubled end 62 may be secured by a non-corrosive clamp or clip, such as a stainless steel crimp ring ("hog ring") or the like. Plastic materials such as wire bundle ties or the like may be substituted for the crimp rings.

The panel attachment ends 64 of the lines 60 each have a loop formed therein, using the same means as that used to secure the lines 60 to the containers 12 or 12a. The panel or lid 18 includes a plurality of outwardly protruding retaining pins 66, which may comprise plastic bolts with a plastic nut 68 being used on each side of the panel or lid 18 to lock the bolt or pin 66 at the desired height above the panel or lid 18. (Additional components, such as washers, etc., may be used, but are not shown in the drawings to provide clarity in the drawing figures.) The loop end 64 of each of the panel attachment lines 60 is stretched over a corresponding bolt or pin 66, to hold the lid or panel 18 securely against the container 12 or 12a as desired. The lid or panel 18 is easily removed by stretching the loop ends 64 of the elastomer panel attachment lines 60 past the ends of the pins or bolts 66 to release the pins 66 from the panel attachment lines 60.

Figure 3:
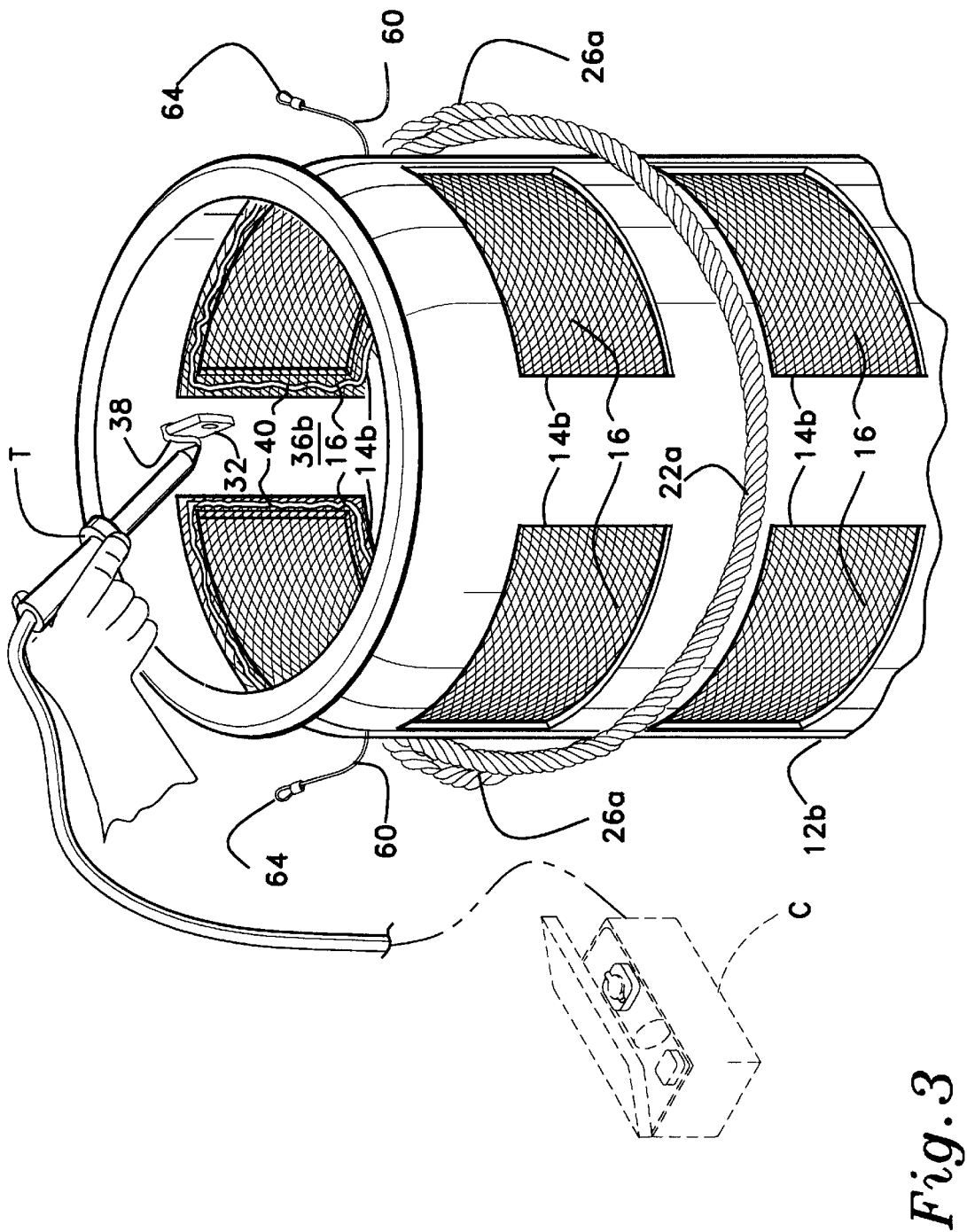
FIG. 3 is a partial perspective view of the aquaculture container of FIG. 2, showing the method of construction thereof.

FIG. 3 discloses the preferred method used for the construction and assembly of the present aquaculture containers. As noted further above, the present containers in each of their embodiments are preferably constructed using plastic component for the shells, access panels or lids, screens, inserts, the tabs within the container shells which provide for the attachment of the inserts therein, and even the fasteners used to secure the inserts within the shells and to secure the lids or panels to the container shells by means of the elastomer plastic panel or lid attachment lines. The synthetic fiber used in the manufacture of the rope handles may also be considered as a plastic material, as well.

The use of plastic materials throughout the present contain provides at least two significant advantages: (1) Such plastic materials are non-corrosive, and judicious selection of the plastics available will also provide good resistance to deterioration due to ultraviolet light which may penetrate shallow waters, as well as other environmental factors. (2) The plastic materials used may be easily and permanently joined together means of a plastic welding technique.

In FIG. 3, an aquaculture container 12b is being assembled using a plastic welding tool T. Such tools T are available on the market from manufacturers such as Seelye, Inc., who manufactures various models of such tools. The basic operating principle of the tool T is very roughly analogous to that of a heat gun or hand operated electric hair dryer, in that air (or inert gas, such as nitrogen) is heated as it is moved past an electric heating element. Portability is provided by means of a small compressor C which is used to provide the required air flow. The heated air or gas then flows out the tip of the tool T, to melt and fuse the plastic materials permanently together, as shown generally in FIG. 3. Additional plastic material (not shown) may be used if desired to add more material to the joint being formed, in the manner of metal welding rod used in conventional metal welding.

The construction of the present aquaculture container in any of its embodiments begins by cutting or otherwise forming the desired number of openings, as in the openings 14b of FIG. 3, in the container shell, as in the container shell 12b of FIG. 3. As noted further above, these openings may be formed in the sides of the container, and/or in either end and/or the removable panel or lid, if desired, and in any suitable shape. The plastic material used for the container shell is not particularly subject to fatigue cracking, thus permitting rectangular openings to be cut or formed therein to provide the most efficient use of the screen material 14b by cutting it into rectangular portions. (Single continuous sections of the screen material may be used to cover several openings, if desired.) While the formation of such openings in the container shell tends to weaken the container to a certain extent, the plastic material used still provides sufficient rigidity to preclude any requirement for additional frame members or support structure, thereby simplifying the construction and production cost of the present container and allowing the solid homogeneous and monolithic container shell to serve as a monocoque structure.

The interior surface area of the container serves as an attachment surface for shellfish such as abalone which crawl slowly over the surface, or perhaps other shellfish which spend their adult lives essentially anchored to a single spot. Accordingly, the interior surface area, e. g., the interior surface 36b of the container 12b of FIG. 3, is preferably roughened, as by sanding or other means (electric or pneumatic powered sanding disc, wire rush or wheel, etc.) to provide the desired "tooth" or grip for such shellfish. At the same time, any sheet panels which may be used in the construction of inserts for the container may be roughened for the same reason.

At this point, the screen material may be cut to the desired size and shape and plastic welded to the inner surface of the container, as in the inner surface 36b of the container 12b FIG. 3, using the plastic welding technique discussed further above. A plastic weld bead 40 will be formed over the periphery of each of the screens 16, as shown, bonding the screens 16 to the peripheries of the openings 14, 14a, or 14b along the inner surface of the container. Any insert 42 which is intended to be installed within the container, may be assembled by plastic welding the two panels or sheets 44 and 46 and gussets 48 together. The insert attachment tabs 32 may also be plastic welded to the internal surface of the container, as shown in FIG. 3 with the plastic welding of the tab 32 to the internal surface 36b of the container 12b.

Holes are also formed through the container shell, for the attachment of the panel or lid attachment lines 60 in the manner described further above, and also for the attachment of a rope support, such as the support 22a of FIG. 3. (The only difference between the container shell 12c of FIG. 3 and the containers of FIGS. 1 and 2, is that the rope support 22a of FIG. 3 is secured only to one end of the container shell, by means of generally diametrically opposed support attachment hole pairs formed in the shell 12c.) The rope support 22a is secured about the support attachment holes by means of eye splices 26a, in the manner discussed further above for the attachment of the rope support 22 of FIG. 1 to the container shell 12.

Pin attachment holes are also formed through the removable panel or lid 18, and the plastic fasteners 66 and 68 are secured to the panel 18 as described further above. The number and spacing of the pins 66 provided through the panel 18 may be varied as desired, but should correspond to the number and spacing of panel attachment lines 60 extending from the container shell. Four lines and four corresponding pins have been found to be sufficient for a circular lid used with a cylindrical barrel or drum, as shown in the drawing figures.

At this point, the insert 42 may be secured to the tabs 32 within the container if desired, by means of the insert attachment fasteners 54 and 56. The container is then ready for stocking with immature shellfish and for placement in a suitable body of water. Nutrient means, such as kelp or other material as desired, may be placed over and across the internal insert 42, to provide a more suitable environment for the shellfish contained within the aquiculture container. The removable panel or lid is secured to the container and placed in the water either horizontally or vertically by means of the rope support means 22 or 22a, depending upon the container type, and appropriate marker means (buoy, etc.) is secured to the container.

Periodically the container is lifted from the water, and the removable panel or lid is removed for culling of the shellfish within the container as they grow and require more room. Such culling operations may be required several times during the course of raising the shellfish, particularly in the case of abalone.

When the shellfish have reached the desired size, the container is removed from the water, the lid is removed, and the mature shellfish removed from the interior of the container and from the insert, if such was initially installed within the container. The container is then essentially ready for use in the raising of another generation of shellfish, with perhaps only a general cleaning being required between uses.

In summary, the present aquaculture container, in any of its embodiments, will be seen to provide an extremely efficient and economical means of raising various types of shellfish for market. The present container is particularly well suited for the raising of abalone, but it will be seen that other types of shellfish may be raised therein if desired. The durability and resistance to corrosion and deterioration provided by the plastic materials used throughout the present container, provide for long life and repeated use over multiple generations of shellfish raised therein. An added benefit of the plastic material is its ability to be plastic welded, thus creating a very strong and permanent bond and simplifying the construction of the container. The solid, monolithic plastic container shell provides sufficient rigidity to act as a monocoque structural member for the container, thus precluding need for additional structural members. Thus, the present aquaculture container will result in cost savings to the aquaculturist which will result in the container paying for itself many times over in its lifetime of use.

It is to be understood that the present invention is not limited to the sole embodiments described above, but encompasses any and all embodiments within the scope of the following claims.

We claim:

1. An aquaculture container, comprising:
   a solid, homogeneous, monolithic, and rigid monocoque aquaculture container shell having at least an internal surface area and a single internal volume extending completely therethrough;
   said container shell including at least one opening therethrough for circulating water through said internal volume, with said at least one opening including screen means disposed thereacross;
   internal structure attachment means affixed to said internal surface area of said container shell; and
   said container shell further including at least one removably installed panel for accessing said internal volume thereof.

2. The aquaculture container according to claim 1, including a shell fish support insert removably installed within said container shell, for increasing said internal surface area within said container shell.

3. The aquaculture container according to claim 2, wherein said insert is formed of a first and a second sheet of material joined orthogonally together to provide a cruciform cross section, with at least one gusset installed between said first sheet and said second sheet for stiffening said insert.

4. The aquaculture container according to claim 2, wherein said internal structure attachment means of said container shell comprises a plurality of tabs affixed within said container shell, with each of said tabs including a fastener hole therethrough, and said insert includes a plurality of attachment passages formed therethrough to provide for the removable attachment of said insert within said container shell.

5. The aquaculture container according to claim 2, wherein said insert includes a roughened shellfish attachment surface.

6. The aquaculture container according to claim 1, wherein said internal surface of said container shell includes a roughened shellfish attachment surface.

7. The aquaculture container according to claim 1, wherein said container shell includes a plurality of panel attachment lines extending therefrom for securing said at least one panel to said container shell, and said at least one removably installed panel of said container shell includes a plurality of retaining pins extending outwardly therefrom for securing said panel attachment lines thereto to secure said at least one panel removably to said container shell.

8. The aquaculture container according to claim 1, including support means extending from said container shell, comprising a flexible rope.

9. The aquaculture container according to claim 1, wherein said container shell comprises a generally cylindrical barrel.

10. The aquaculture container according to claim 1, wherein said container shell, said internal structure attachment means, said screen means, and said at least one removably installed panel are each formed of plastic, with said internal structure attachment means and said screen means being secured to said internal surface of said container shell by plastic welding.

11. The aquaculture container according to claim 10, including a plastic shellfish support insert and a plurality of plastic fasteners therefor, a plurality of plastic retaining pins for said at least one removably installed panel and a plurality of plastic fasteners therefor, a plurality of plastic panel attachment lines, and at least one flexible plastic rope support means.

12. A method of constructing an aquaculture container, comprising at least the following steps:
    (a) providing a solid, homogeneous, monolithic, and rigid plastic monocoque aquaculture container shell having an internal surface area, an external surface, and a single internal volume extending completely therethrough;
    (b) further providing a plurality of plastic internal structure attachment tabs and at least one plastic screen;
    (c) forming at least one opening through the container shell;
    (d) plastic welding the internal structure attachment tabs to the internal surface area of the container shell; and
    (e) further plastic welding the at least one screen to the internal surface area of the container shell across the at least one opening therethrough.

13. The method of constructing an aquaculture container, according to claim 12 further including the steps of:
    (a) providing a shellfish support insert and fasteners therefor; and
    (b) removably fastening the shellfish support insert to the internal structure attachment tabs of the container shell.

14. The method of constructing an aquaculture container, according to claim 12 further including the steps of:

(a) providing a removable panel for the container shell including a plurality of retaining pins extending outwardly therefrom;

(b) further securing a plurality of panel attachment lines to the container shell adjacent the removable panel; and (c) removably installing the panel to the container shell by securing the panel attachment lines about the panel retaining pins.

15. The method of constructing an aquaculture container, according to claim 12 further including the steps of:

(a) providing a plurality of support attachment passages through the container shell;

(b) further providing a rope support for the container shell;

(c) looping each end of the rope support through the support attachment passages; and (d) securing each end of the rope support to the rope by forming an eye splice.

* * * * *